(12) United States Patent
Krumm et al.

(10) Patent No.: US 8,460,500 B2
(45) Date of Patent: Jun. 11, 2013

(54) METHOD FOR PRODUCING CORRUGATED MATERIAL

(75) Inventors: Christopher A. Krumm, Akron, OH (US); Peter Watson, Dublin, OH (US); John M. Clifford, Mainville, OH (US)

(73) Assignee: Greif Packaging LLC, Delaware, OH (US)

( * ) Notice: Subject to any disclaimer, the term of this patent is extended or adjusted under 35 U.S.C. 154(b) by 215 days.

(21) Appl. No.: 12/732,948

(22) Filed: Mar. 26, 2010

(65) Prior Publication Data
US 2011/0232839 A1 Sep. 29, 2011

(51) Int. Cl.
*B29C 56/00* (2006.01)
*B32B 38/04* (2006.01)

(52) U.S. Cl.
USPC ............ 156/271; 156/267; 156/270; 156/353

(58) Field of Classification Search
USPC ................. 156/256, 259, 267, 269, 270, 271, 156/353; 83/76; 242/615.3
See application file for complete search history.

(56) References Cited

U.S. PATENT DOCUMENTS

| | | | | |
|---|---|---|---|---|
| 2,167,908 A | * | 8/1939 | Richards | 242/588.6 |
| 2,369,617 A | | 2/1945 | Somerville | |
| 2,934,987 A | | 5/1960 | Rauline | |
| 3,195,385 A | * | 7/1965 | Paterson | 83/76 |
| 3,324,751 A | | 6/1967 | Rubinstein et al. | |
| 3,626,457 A | | 12/1971 | Duerr | |
| 3,732,761 A | | 5/1973 | Sanders | |
| 3,826,169 A | | 7/1974 | Schnell et al. | |
| 4,020,406 A | | 4/1977 | Tokuno et al. | |
| 4,034,635 A | | 7/1977 | Woolston | |
| 4,058,041 A | | 11/1977 | Ito | |
| 4,128,886 A | | 12/1978 | Woolston | |
| 4,183,271 A | | 1/1980 | Martin | |
| 4,196,645 A | | 4/1980 | Shimizu et al. | |
| 4,294,143 A | | 10/1981 | Lieberman | |
| 4,422,358 A | * | 12/1983 | Hull et al. | 83/356.3 |
| 4,507,948 A | | 4/1985 | Wallis | |
| 5,488,887 A | | 2/1996 | Kitamura | |
| 6,205,898 B1 | | 3/2001 | Surina | |
| 2005/0193879 A1 | | 9/2005 | Champeau et al. | |

FOREIGN PATENT DOCUMENTS

| | | | |
|---|---|---|---|
| JP | 2001277182 | | 10/2001 |
| JP | 2002036171 | | 2/2002 |
| JP | 2002178293 | | 6/2002 |
| JP | 2002326187 | | 11/2002 |
| JP | 2009-119836 | * | 6/2009 |
| JP | 02009119836 A | * | 6/2009 |

OTHER PUBLICATIONS

Air Systems Design, Inc., Trim Cutters, www.airsystemsdesign.com/trim-cutters.html, document is undated but the document was printed from the pertinent website on Oct. 23, 2009.

* cited by examiner

*Primary Examiner* — Linda L Gray
(74) *Attorney, Agent, or Firm* — Sand & Sebolt

(57) ABSTRACT

This invention relates to a method for producing corrugated material and processing strip material which is removed from the edges of the corrugated material during the formation process. The strip material is cut away from the corrugated material and expelled at a variable line speed to a trim processing machine. The line speed is measured by a sensor which provides a signal representation of the speed to a cutter assembly. The cutter assembly cuts the strip material at a cutting speed which is sequenced to the line speed such that the strip material is cut into a plurality of pieces. The pieces are generally uniform in shape and size across variations in the line speed as the cutting speed is synchronized with the line speed.

10 Claims, 16 Drawing Sheets

FIG-3

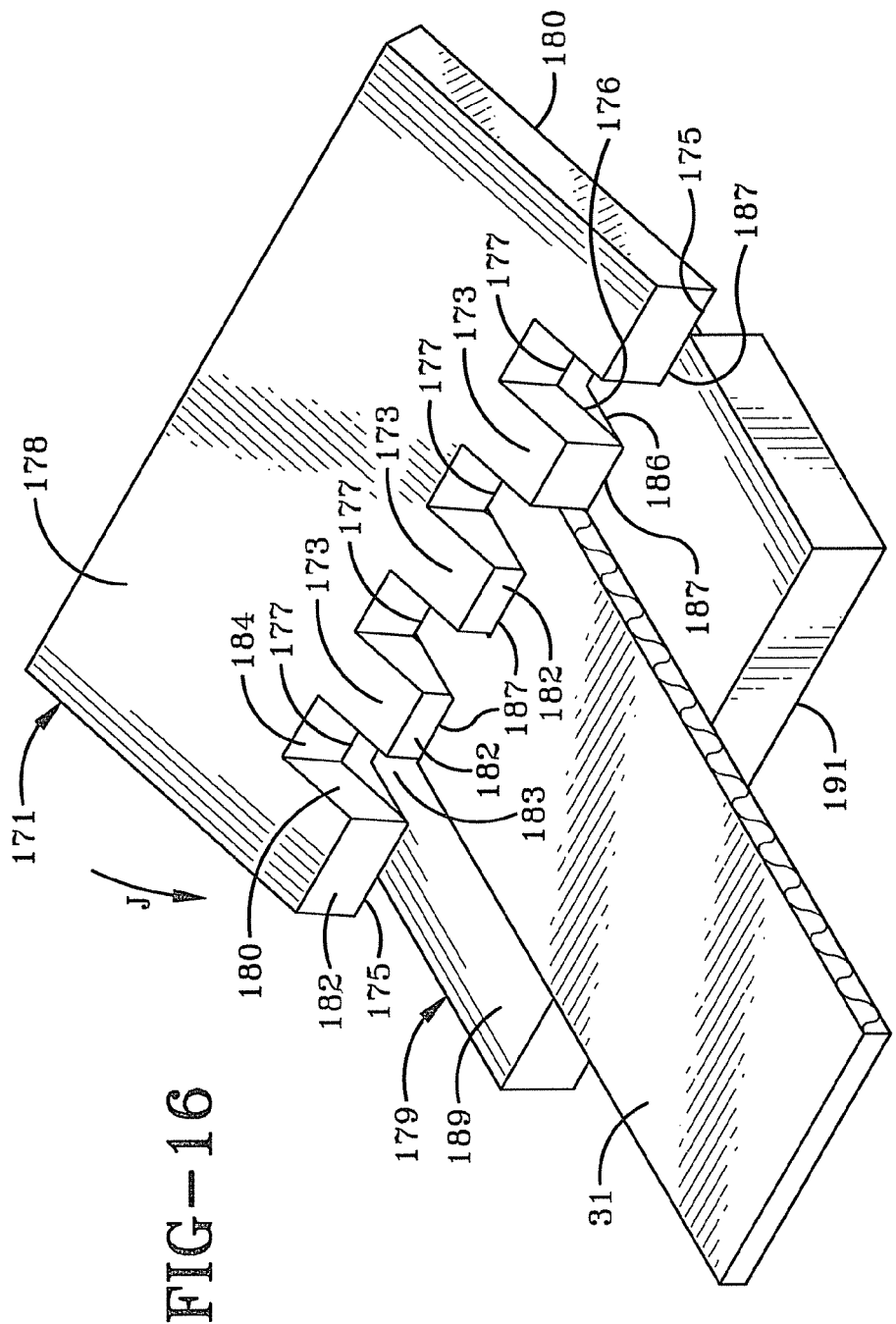

METHOD FOR PRODUCING CORRUGATED MATERIAL

BACKGROUND OF THE INVENTION

1. Technical Field

The invention relates generally to a method for producing corrugated material. More particularly, the invention relates to a method for forming corrugated material by cutting the edges off the corrugated material into a strip material, and then processing the strip material into smaller pieces at a variable processing speed. Specifically, the invention relates to a method for varying the processing speed in response to variations in the input speed of the strip material, such that the strip material is continuously converted into a plurality of smaller pieces having the same generally uniform shape.

2. Background Information

This invention relates to the process of making corrugated material, forming the material into boxes or other similar commercial products, and processing the waste edge strip material of this process into a new commercial product. Previously, the waste edges of this process were discarded as unusable.

Paper based corrugated material is formed in a corrugator and fed directly into an edge cutter. The edge cutter cuts the corrugated material to a specified width to match the size requirements for the particular commercial product being produced. The edge strip material is cut away and the corrugated material travels on to be formed into the finished product. As the strip material comes out of the edge cutter, it is either fed into a bin for later processing, or fed into a trim processing machine ("trim cutter") whereby the long narrow pieces are cut into smaller pieces by a blade. After this cutting stage, the cut strip material is collected, baled, and processed as waste by-product of the corrugation process.

Trim processing machines to date include a blade which simply cuts across the width of the strip material at a static interval, regardless of the speed with which the strip material enters the trim processing machine. This static cutting frequency results in large pieces when the strip material moves through the machine at a fast rate, and small pieces when the strip material moves through the machine at a slow rate. Furthermore, trim processing machines and methods to date cannot match the fast line speeds of the corrugator and edge cutter. Therefore the strip material typically is collected after exiting the edge cutter, and later fed into the trim processing machine.

Heretofore, existing trim processing machines and methods have been characteristically inefficient and lacking in processing the waste edge strip material during the formation of the corrugated product. Therefore, the need exists for a trim processing method which can match the fast line speeds of the corrugator so the strip material may be processed at the same time the corrugator is forming the commercial product. There is also a need to cut the strip material at a cutting frequency which is sequenced or matched with the speed of the corrugator line and edge cutter, thereby allowing uniformly sized pieces of the cut strip material to be produced across the entire range of possible input speeds which may dynamically change during operation. The need also exists for a trim processing method which cuts across both the length and width of the strip material to produce cut trim pieces which are smaller than the overall width of the trim.

If a manufacturer of corrugated products could produce a uniformly sized by-product of the corrugation process, regardless of the line speed or width of the strip material, the cut strip material pieces could be resold as a commercial product and used various applications such settings as animal bedding. This represents an enormous improvement in the field, as currently scrap strip material pieces are simply discarded.

BRIEF SUMMARY OF THE INVENTION

This invention focuses on a method for producing corrugated material and processing the strip material expelled as a by-product of the production process at a variable line speed. The method of the present invention utilizes a corrugator having a flute processing device for producing a fluted sheet, and a backer device to apply a liner to the fluted sheet and expel a corrugated material at a line speed. The expelled corrugated material is then received by an edge cutter machine, wherein edge strip material is cut off the edges of the corrugated material. This edge strip material is subsequently fed into a trim cutting machine. The trim cutting machine is generally comprised of a sensor for measuring the line speed, a cutter assembly which is operatively connected to the sensor, and a feeder assembly which is also operatively connected to the sensor. The feeder assembly receives the strip material from the edge cutter machine and conveys the strip material to the cutter assembly at the line speed. The cutter assembly cuts the strip material at a cutting speed into a plurality of pieces having a uniform size and shape and collects the pieces for eventual commercial use. This uniform shape is ensured by varying the cutting speed in response to variations of the line speed. It is readily understood that the edge cutter machine may exist as a sub-machine within the overall corrugator machine, or may exist separately.

The feeder assembly preferably used in the present method has a plurality of first bumpers disposed within a housing, and a plurality of second bumpers disposed within the housing, whereby the first and second bumpers rotationally cooperate to convey the strip material therethrough. The feeder assembly further includes a motor, whereby the motor is operationally connected to the sensor, and the first and second bumpers are rotationally controlled by the motor. The motor then rotates the bumpers to match the line speed and thereby convey the strip material through the housing to the cutter assembly at the line speed.

The cutter assembly preferably used in the present method has at least one rotor having a plurality of blade assemblies disposed thereon, a motor, and an anvil having a teeth portion. The blade assemblies each includes a blade portion complementarily shaped with the teeth portion. The rotor is rotated by the motor at the cutting speed to engage the blade portion with the teeth portion to cut the strip material.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 3 is a right side elevational view thereof;

FIG. 16 is an enlarged perspective view of the blade plate cutting the edge trim against the anvil as shown in FIG. 14.

Similar numbers refer to similar parts throughout the drawings.

DETAILED DESCRIPTION OF THE INVENTION

The preferred machine for carrying out the steps of processing strip material of the present invention is indicated generally at 1, and shown in FIGS. 1-16. The strip material of the preferred embodiment is the waste edge strip material trimmed off the sides of corrugated paperboard during the corrugation process. Hereafter the machine for processing strip material will be referred to as trim processing machine 1, as the preferred embodiment relates to the method of manufacturing corrugated products such as boxes and shipping containers, although it is readily understood that it can be other types of materials within the concept of the present invention.

Figure 1:
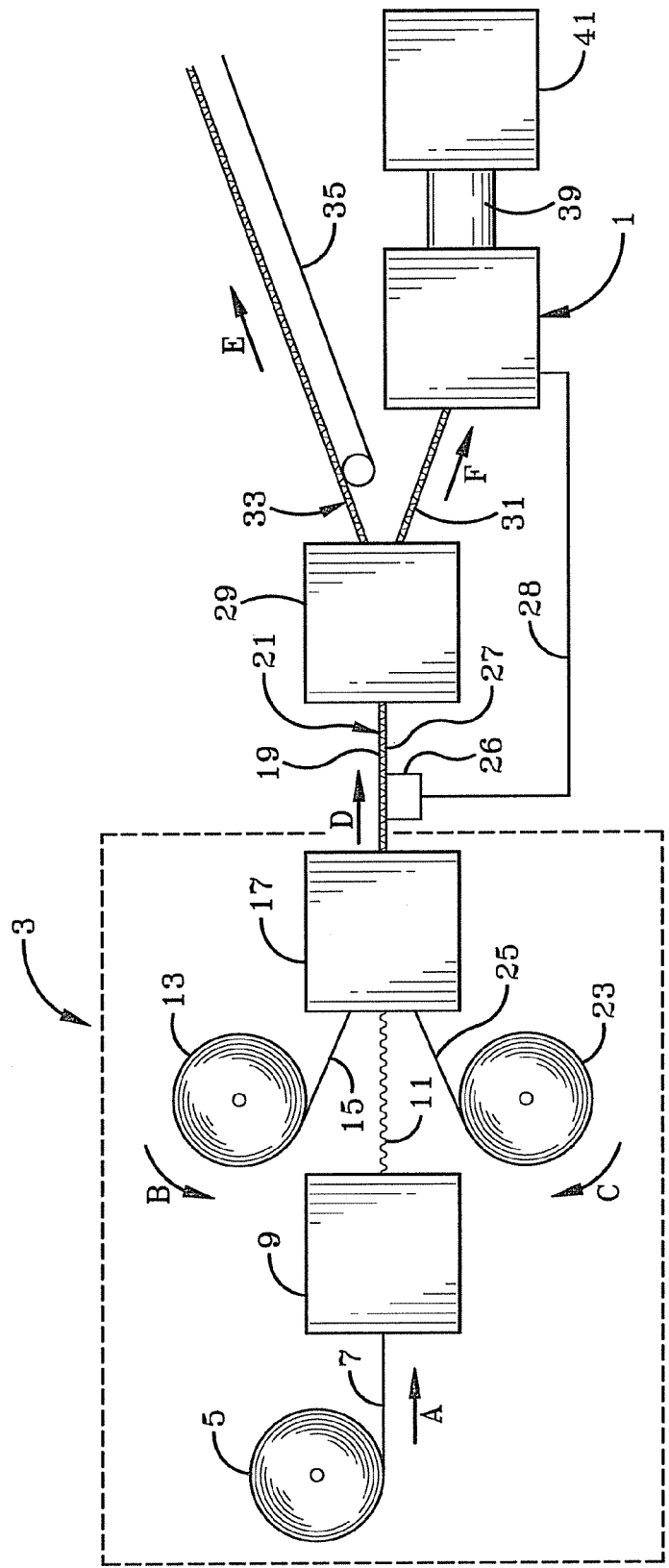
FIG. 1 is a diagrammatical view of the corrugation process.

The general machine and system for turning raw materials into corrugated material is shown diagrammatically in FIG. 1. A corrugator 3 includes a first roll 5 of paper-based material 7 which is rotated off first roll 5 into a flute processing device 9 in the direction of Arrow A. Flute processing device 9 forms a flute into material 7 and outputs a fluted sheet 11. Corrugator 3 further includes a second roll 13 of paper-based material 15 which is rotated off second roll 13 in the direction of Arrow B and into a backer device 17 along with fluted sheet 11. Backer device 17 adheres material 15 onto fluted sheet 11 to form a top liner 19 on a raw corrugated sheet 21. Corrugator 3 further includes a third roll 23 of paper-based material 25 which is rotated off third roll 23 in the direction of Arrow C and into backer device 17. Backer device 17 adheres material 25 onto fluted sheet 11 to form a bottom liner 27 on raw corrugated sheet 21. Alternatively, flute processing device 9 may form the flute in material 7 and adhere material 15 to fluted sheet 11 in a first apparatus commonly referred to as a "single-liner", and subsequently adhere material 25 in a second apparatus referred to as a "double-backer". It will be readily understood that the machine and system shown in FIG. 1 for carrying out the method of the present invention is a simplified diagram of this process.

Raw corrugated sheet 21 exits backer device 17 in the direction of Arrow D at a variable speed and comprises a raw corrugated material having a width which corresponds to the width of materials 7, 15, and 25. A sensor 26 is located proximate backer device 17 and measures the speed with which raw corrugated sheet 21 exits the backer device. Sensor 26 passes the speed information to trim processing machine 1 through a conductor 28. Next, raw corrugated sheet 21 is fed into an edge cutter 29 which cuts an elongate pair of trim edges 31 off raw corrugated sheet 21 to form a finished corrugated sheet 33. Finished corrugated sheet 33 conforms to the particular width requirement of the intended product, and is carried away by a conveyer belt 35 or other transport mechanism in the direction of Arrow E for further processing. Trim edges 31 exit edge cutter 29 and enter trim processing machine 1 in the direction of Arrow F. Trim processing machine 1 performs processing functions therein at a particular speed based on the signal supplied by sensor 26 through conductor 28, and expels a plurality of uniform cut pieces 37 (FIG. 11) of trim edges 31 through a duct 39. Pieces 37 travel through duct 39 into a hopper 41 where they are collected and stored, and removed as desired by the user.

Figure 2:
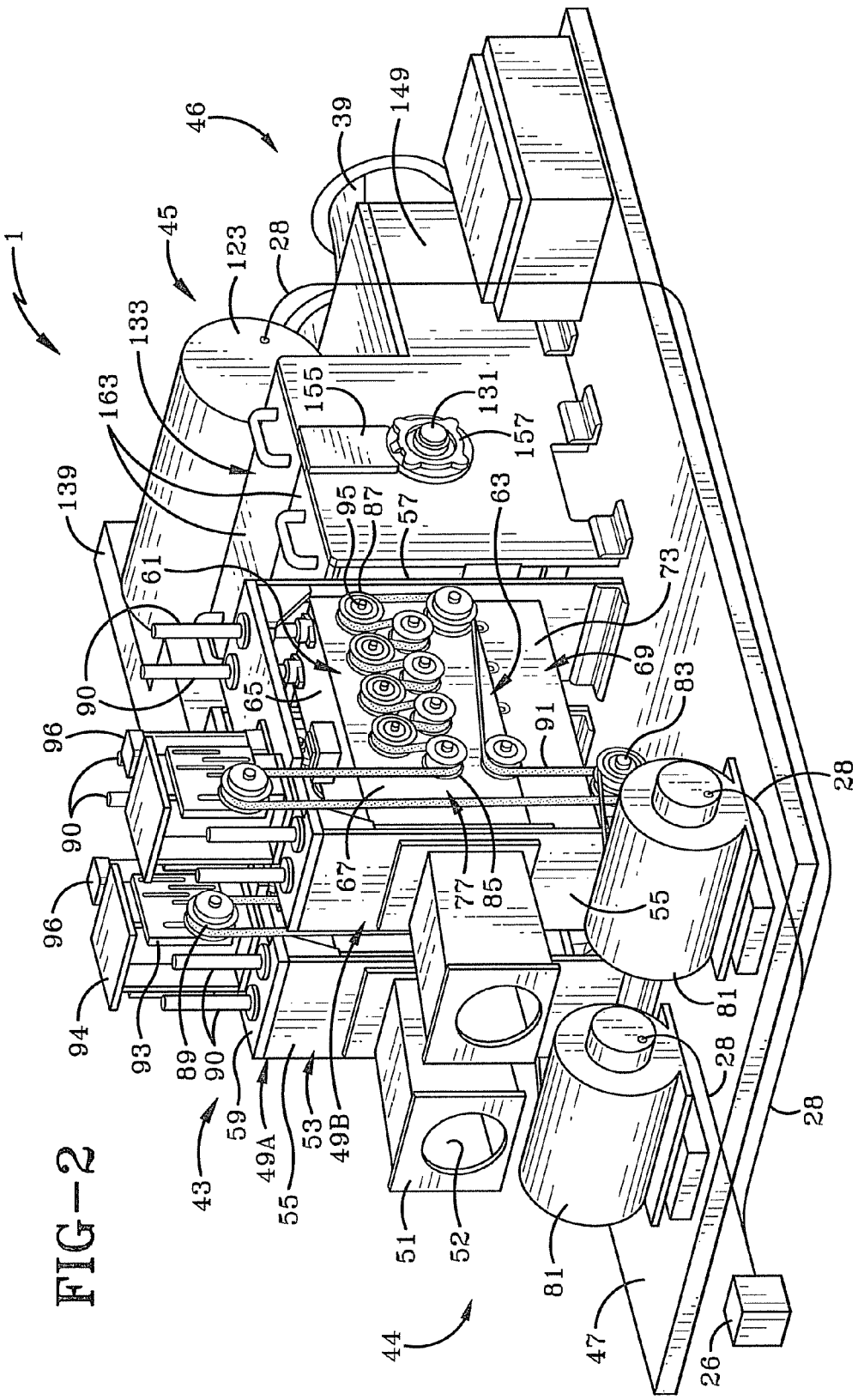
FIG. 2 is a perspective view of the trim processing machine utilized in the method of the present invention.
Figure 10:
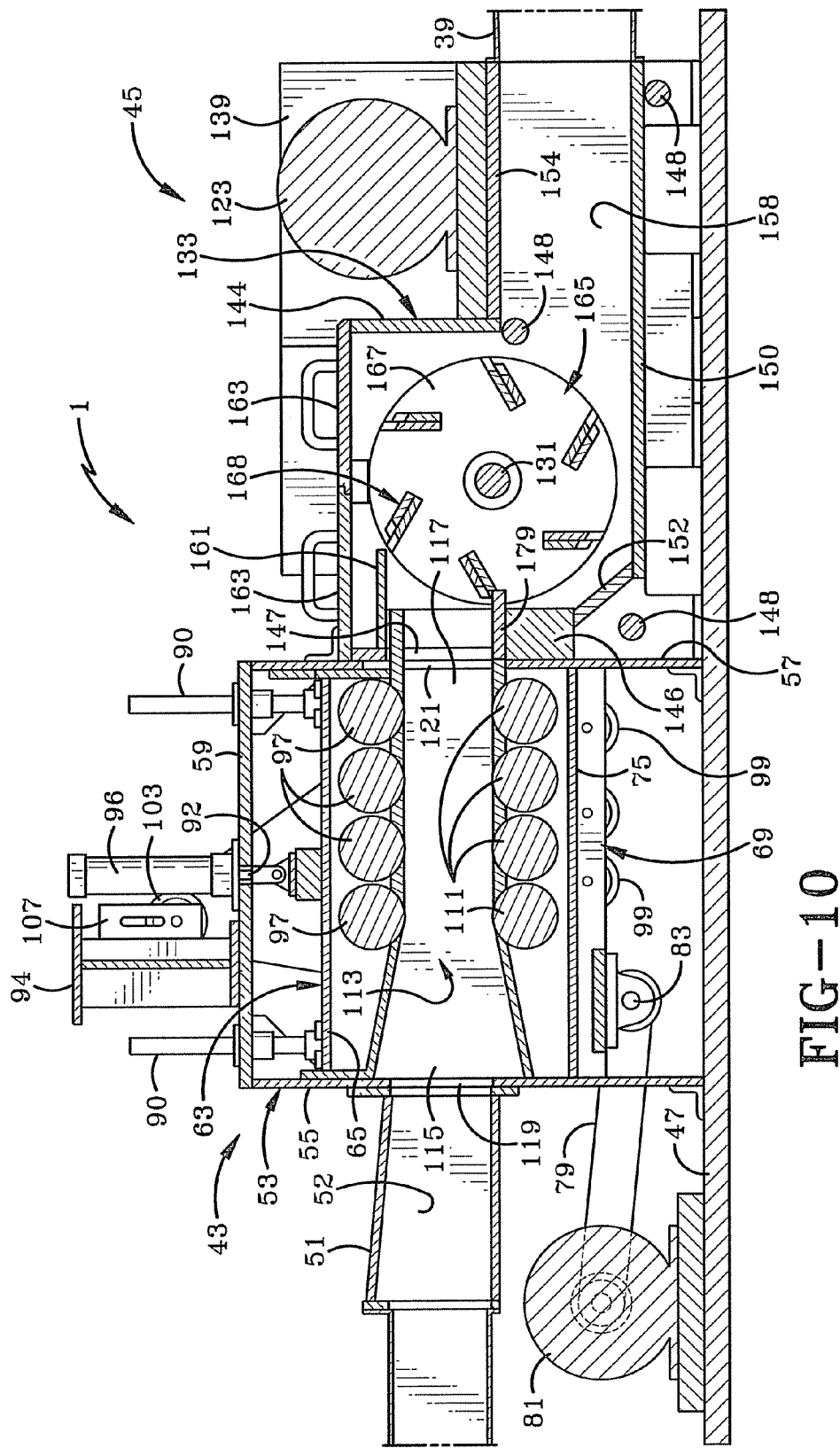
FIG. 10 is a vertical cross-sectional view of the trim processing machine utilized in the method of the present invention.

As shown in FIGS. 2-5, trim processing machine 1 has a front end 44, a back end 46, and a feeder assembly 43 abutting a cutter assembly 45, whereby both feeder assembly 43 and cutter assembly 45 are secured to a base 47. Feeder assembly 43 includes of a pair of feeder sub-assemblies 49A and 49B. Feeder sub-assemblies 49A and 49B are substantially identical, therefore only 49A is described in detail. Feeder sub-assembly 49A includes an inlet 51 secured to a frame 53 and defining an inlet channel 52 therethrough. Frame 53 includes a front wall 55, a back wall 57, and an upper wall 59 disposed therebetween, whereby front wall 55 and back wall 57 are secured to base 47. As shown in FIGS. 2 and 10, a roller housing 61 having a general box-like structure is disposed intermediate front wall 55 and back wall 57 and includes an adjustable upper structure 63 having a top wall 65 and a side wall 67. Roller housing 61 further includes a non-adjustable lower structure 69 having a first sidewall 71 (FIG. 4), a second sidewall 73 (FIG. 3), and a bottom wall 75 (FIG. 10) extending therebetween.

Feeder sub-assembly 49A further includes an adjustable first roller system 77 and a non-adjustable second roller system 78, both of which are driven by a drive shaft 83. Drive shaft 83 is powered by a drive belt 79 extending from a drive motor 81. Drive shaft 83 extends the width of sub-assembly 49A (FIG. 5) to provide rotational turning force to roller systems 77 and 78. Adjustable roller system 77 (FIG. 3) is comprised of a plurality of pulleys 85 and a plurality of attached rollers 87 mounted on sidewall 67. Pulleys 85 and rollers 87 are connected to drive shaft 83 and an adjustable top pulley 89 by a first belt 91. Top pulley 89 is disposed on an adjustment plate 93 movably mounted on a beam 94 extending from top wall 59. Pulleys 85 are mounted on sidewall 67 and rotate to allow first belt 91 to pass thereover to maintain tension in first belt 91. Each roller 87 includes a bumper shaft 95 extending through sidewall 67 and connected to a bumper 97 within roller housing 61 (FIG. 10), whereby rotation of roller 87 rotates bumper 97 by way of bumper shaft 95.

Non-adjustable second roller system 78 (FIG. 4) is similar to first roller system 79 and includes a plurality of pulleys 99 and a plurality of attached rollers 101 disposed on first sidewall 71. Pulleys 99 and rollers 101 are connected to a top pulley 103 by a second belt 105 powered by drive shaft 83. Top pulley 103 is disposed on an adjustment plate 107 movably mounted on beam 94. Each roller 101 includes a bumper shaft 109 extending through first sidewall 71 and connected to a bumper 111 within roller housing 61 (FIG. 10), whereby rotation of roller 101 rotates bumper 111 through bumper shaft 109.

A pair of alignment rods 90 (FIG. 4) are secured to top wall 65 of upper structure 63 and extend upwardly through top wall 59 of frame 53. An adjustment rod 92 (FIG. 11) is secured to top wall 65 and extends upwardly through top wall 53 and into an adjustment mechanism 96, whereby upper structure 63 may be raised or lowered to change the distance between bumpers 97 and bumpers 111 within roller housing 61. As upper structure 63 is adjusted to change the distance between bumpers 97 and 111, top pulley 89 of first roller system 77 adjusts the position on plate 93 to maintain tension within first roller system 77 and first belt 91.

Figure 3:
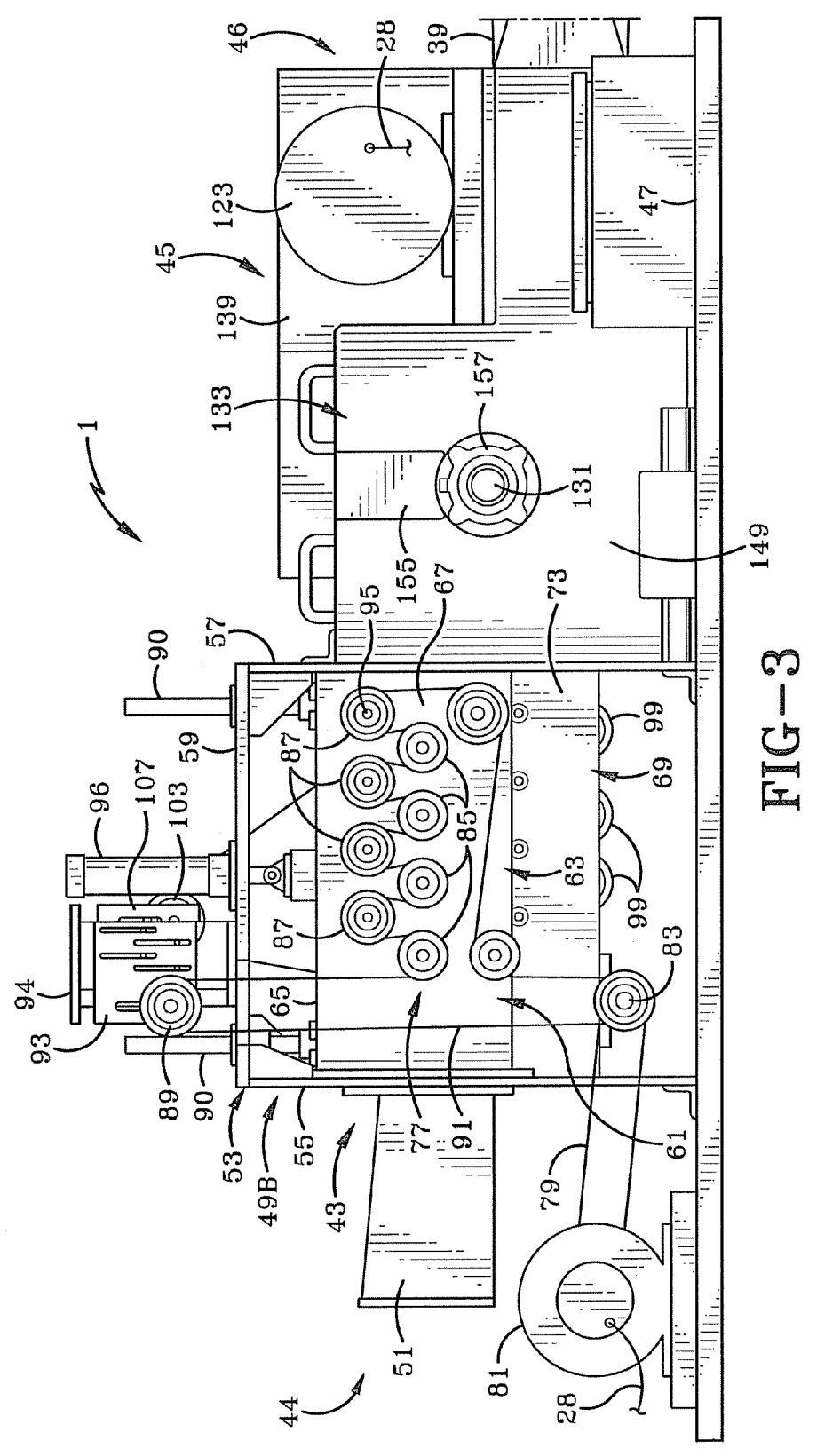
Figure 4:
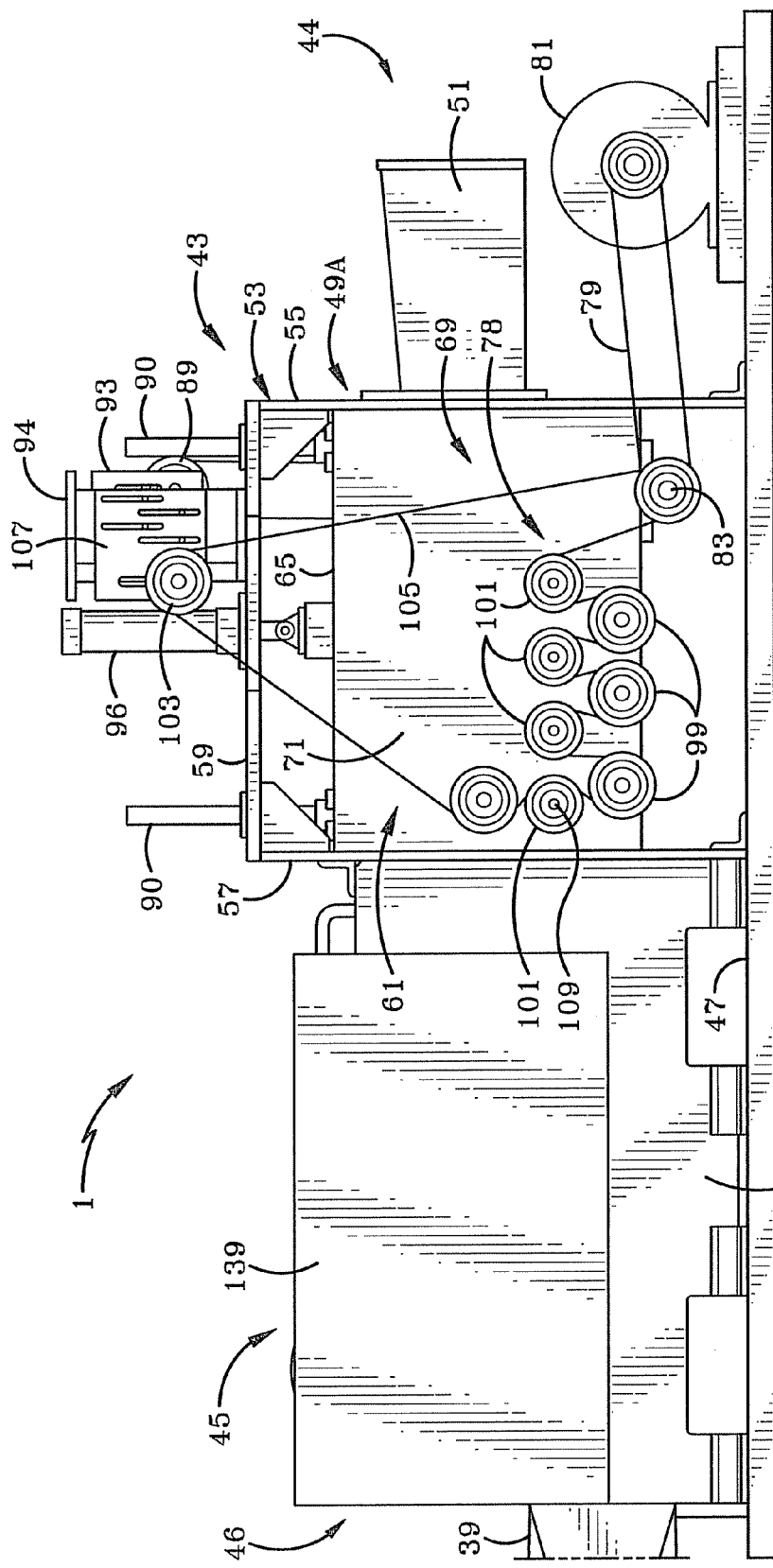
FIG. 4 is a left side elevational view thereof.
Figure 11:
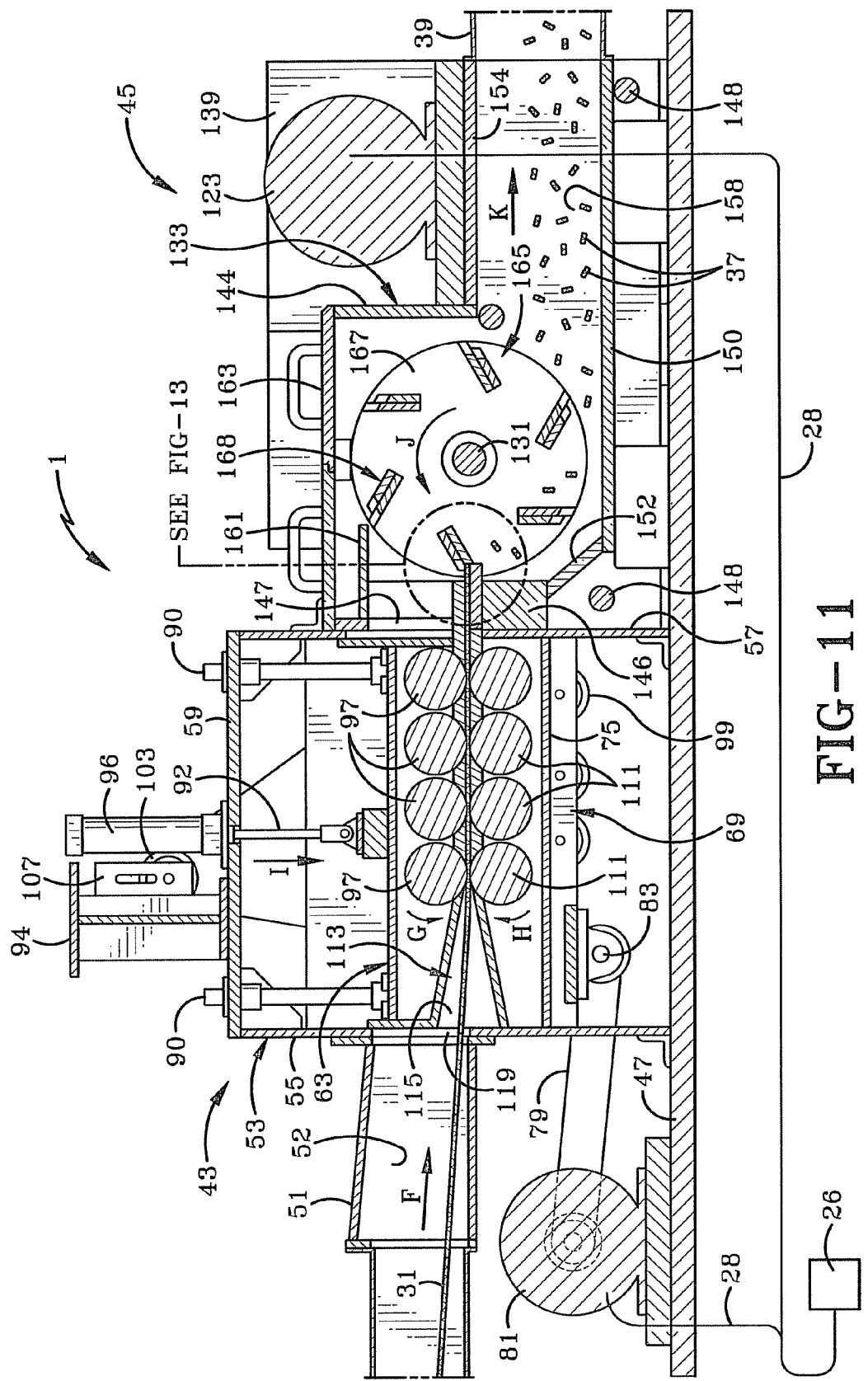
FIG. 11 is a vertical cross-sectional view of the trim processing machine as shown in FIG. 10, with the trim edge being processed therein.

As shown in FIGS. 3, 4, 10, and 11, feeder sub-assembly 49A includes an internal roller channel 113 which extends from a first end 115 proximate an opening 119 formed in front wall 55 of frame 53 to a second end 117 proximate an opening 121 defined in back wall 57 of frame 53. As shown in FIGS. 3 and 4, motors 81 rotate drive belts 79 at a particular speed, sequenced to the line speed, which rotates drive shaft 83. Drive shaft 83 rotates first belt 91 which rotates pulleys 85 and rollers 87. Drive shaft 83 also rotates second belt 105 which rotates pulleys 99 and rollers 101. Rollers 87 and 101 rotate bumper shafts 95 and 109, respectively, and in turn rotate bumpers 97 and 111, respectively, within roller housing 61. As shown in FIG. 11, bumpers 97 and 111 rotate in the directions of Arrows G and H, respectively, to frictionally pull trim edges 31 into roller housing 61. Motor 81 accepts line speed information from sensor 26 through conductor 28 and adjusts the speed with which motor 81 rotates drive belt 79, thereby sequencing the speed with which bumpers 97 and 111 pull trim edges 31 with the line speed.

Figure 5:
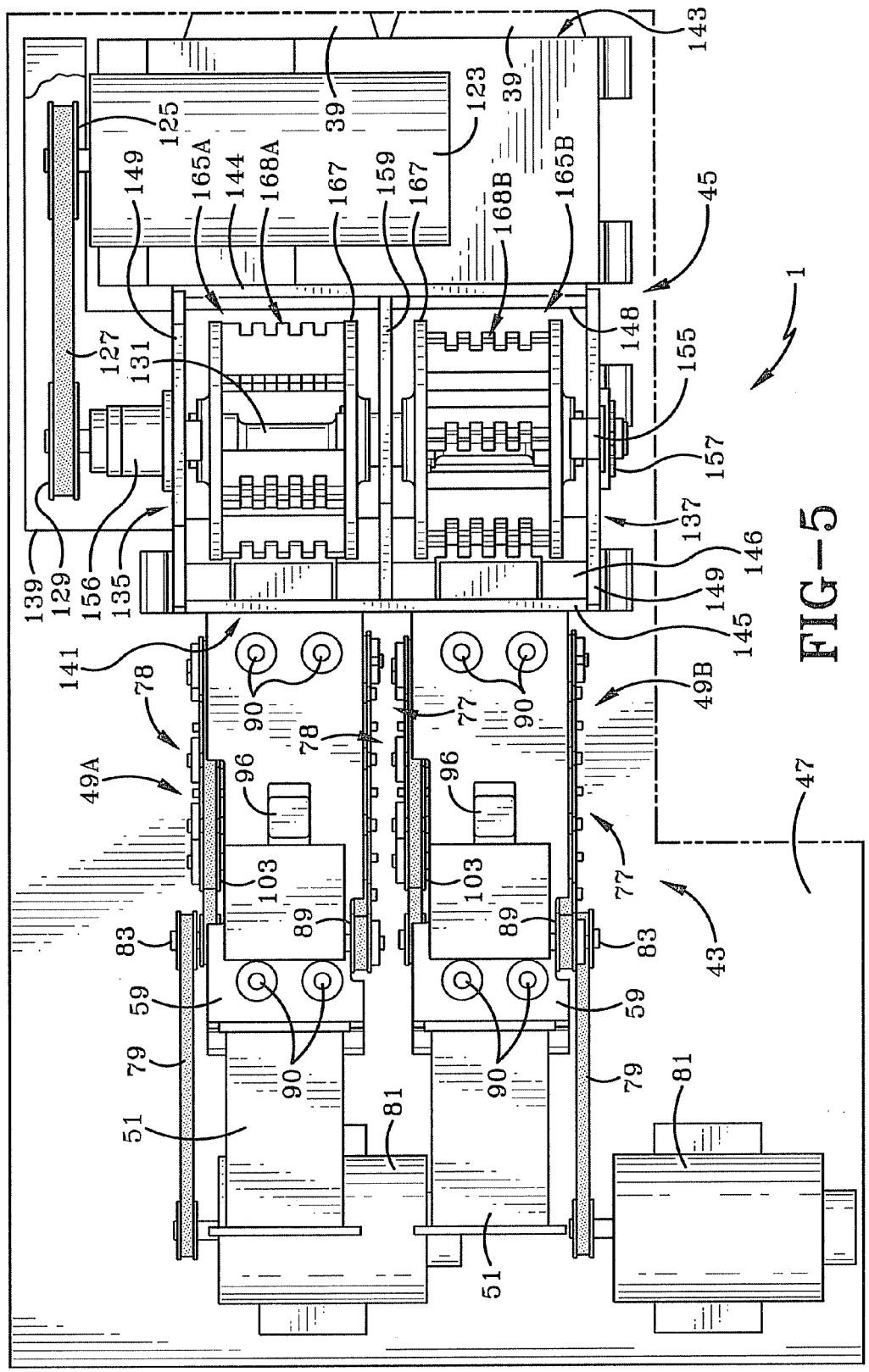
FIG. 5 is a top view thereof.
Figure 6:
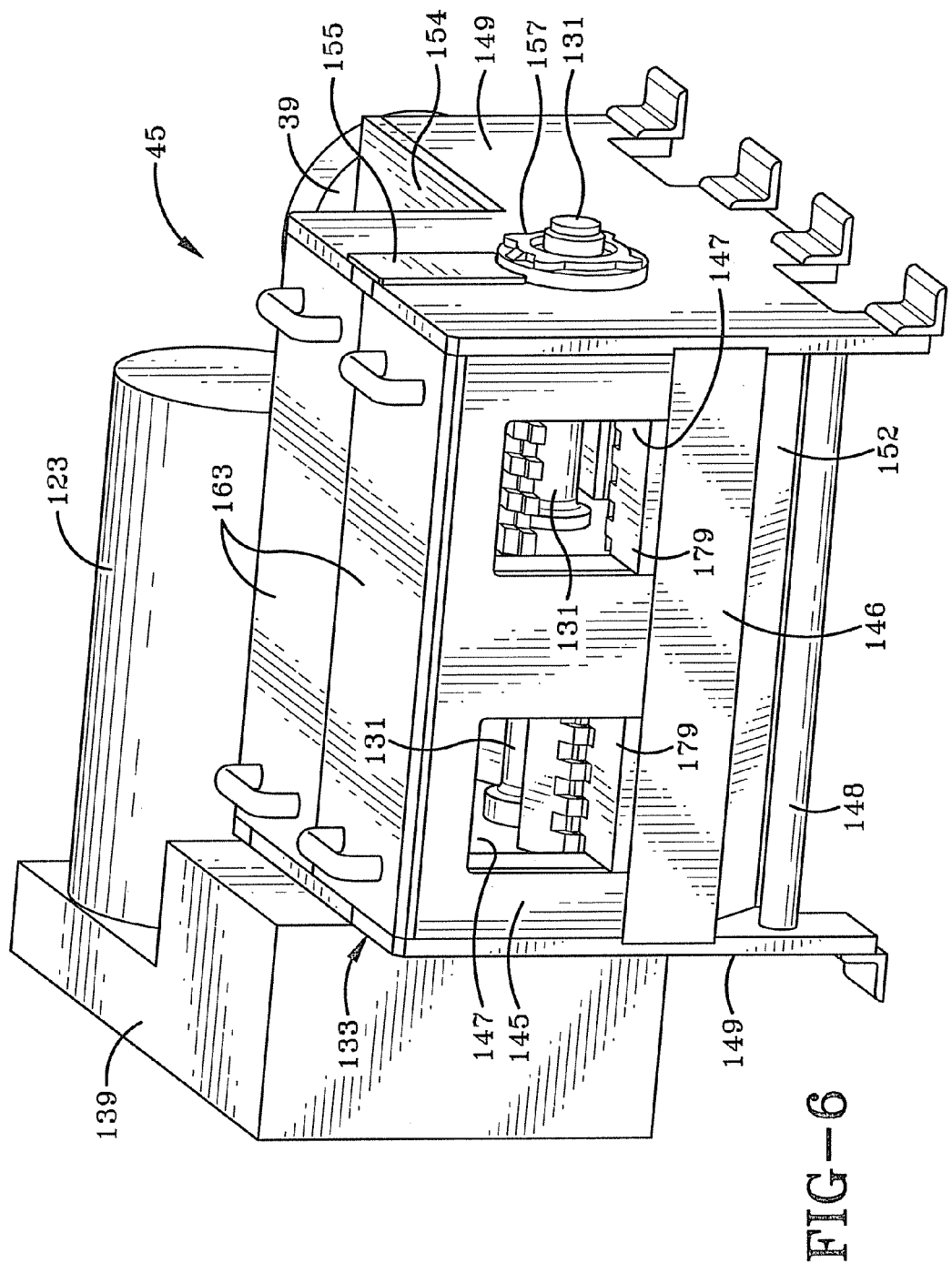
FIG. 6 is a perspective view of the rotor housing utilized in the present invention.
Figure 7:
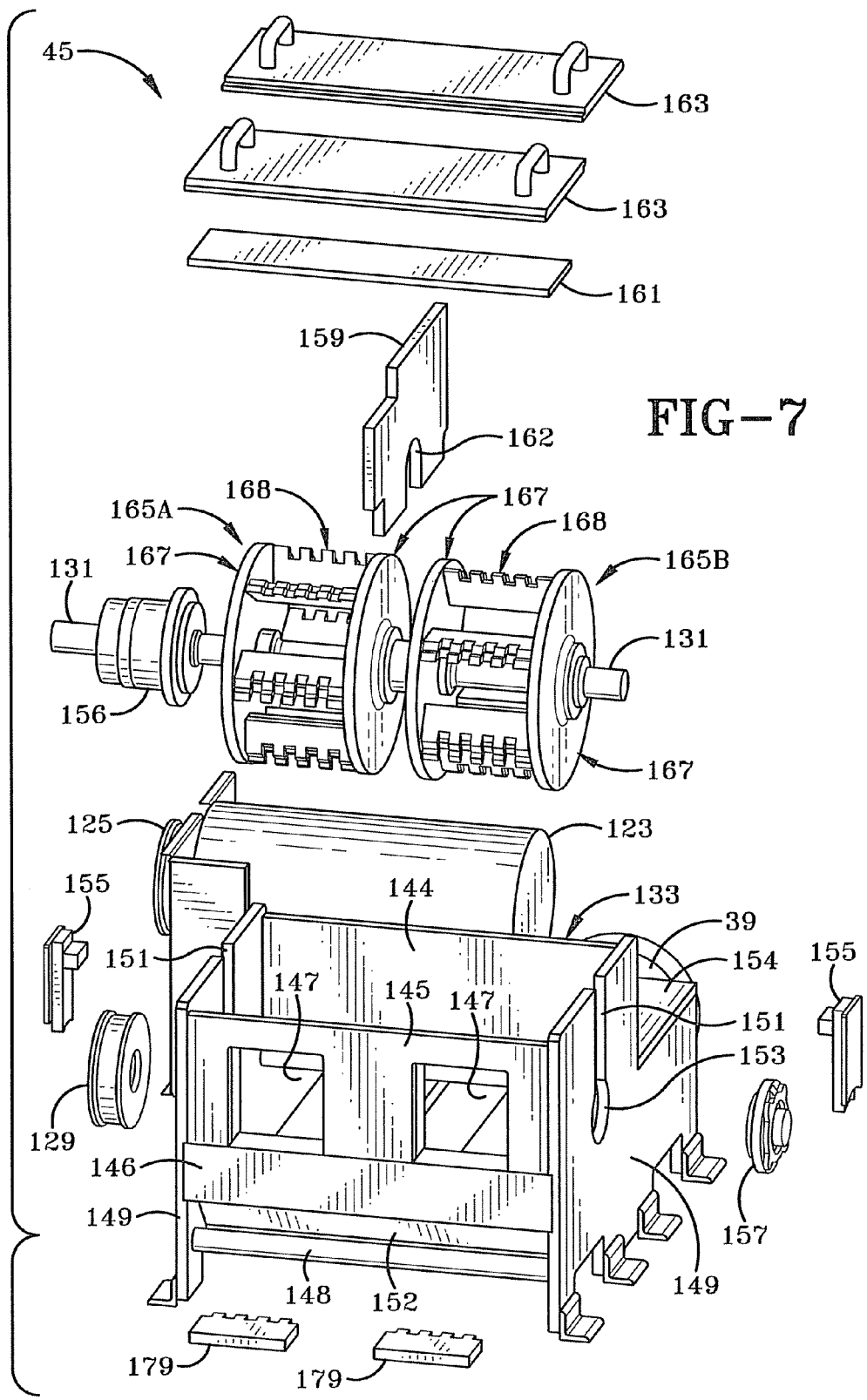
FIG. 7 is an exploded perspective view of FIG. 6.

As shown in FIG. 10, cutter assembly 45 is secured to feeder assembly 43 proximate second end 117 and opening 121. As shown in FIGS. 5-7, cutter assembly 45 includes a motor 123, which rotates a drive wheel 125 to turn a drive belt 127 and rotate a wheel 129 secured to a shaft 131. Shaft 131 extends through a rotor housing 133 from a first side 135 to a second side 137. Drive wheel 125, drive belt 127, and wheel 129 are enclosed within a drive housing 139.

As shown in FIGS. 5, 6, and 10, rotor housing 133 extends from a first end 141 to a second end 143, and includes an anvil mount 146 proximate first end 141 and a front wall 145 defining a pair of cutter apertures 147 therein. A pair of sidewalls 149 form the sides of rotor housing 133 and are secured together by a plurality of tie rods 148. A deflector wall 152 extends from an anvil mount 146 to a bottom wall 150. The upper end of rotor housing 133 is enclosed by a pair of access panels 163 removably secured and extending between front wall 145 and a back wall 144 to allow access to rotor housing 133. Back wall 144 extends from access panels 163 to a top back wall 154. Top back wall 154, sidewalls 149, and bottom wall 150 define a channel 158 therebetween which aligns with duct 39.

As shown in FIG. 7, sidewalls 149 define a notch 151 sized to pass shaft 131 therethrough. Sidewalls 149 further define a rotation hole 153 whereby shaft 131 is sized to rest and slidably rotate therein. A pair of notch caps 155 cover notches 151 when shaft 131 is securely received within rotation hole 153. A bearing 156 is disposed on one end of shaft 131, and a bearing 157 is disposed on the opposite end to facilitate axial rotation of shaft 131. A debris shelf 161 and spacer wall 159 having a notch 162 are disposed in rotor housing 133. Spacer wall 159 is generally parallel to sidewalls 149, whereby shaft 131 is fittably and rotatably received in notch 162 to prevent upward movement.

As shown in FIGS. 5, and 11, conductor 28 provides the line speed information to motor 123 which controls the rotational speed of shaft 131. Motor 123 controls rotational speed of shaft 131 by increasing or decreasing the rotational speed of drive wheel 125, which turns drive belt 127. Drive belt 127 rotates wheel 128 which is secured to shaft 131 and thereby rotates shaft 131. As discussed previously, shaft 131 is supported at each end by bearings 156 and 157 which facilitate efficient rotational turning of shaft 131 by motor 123.

Figure 8:
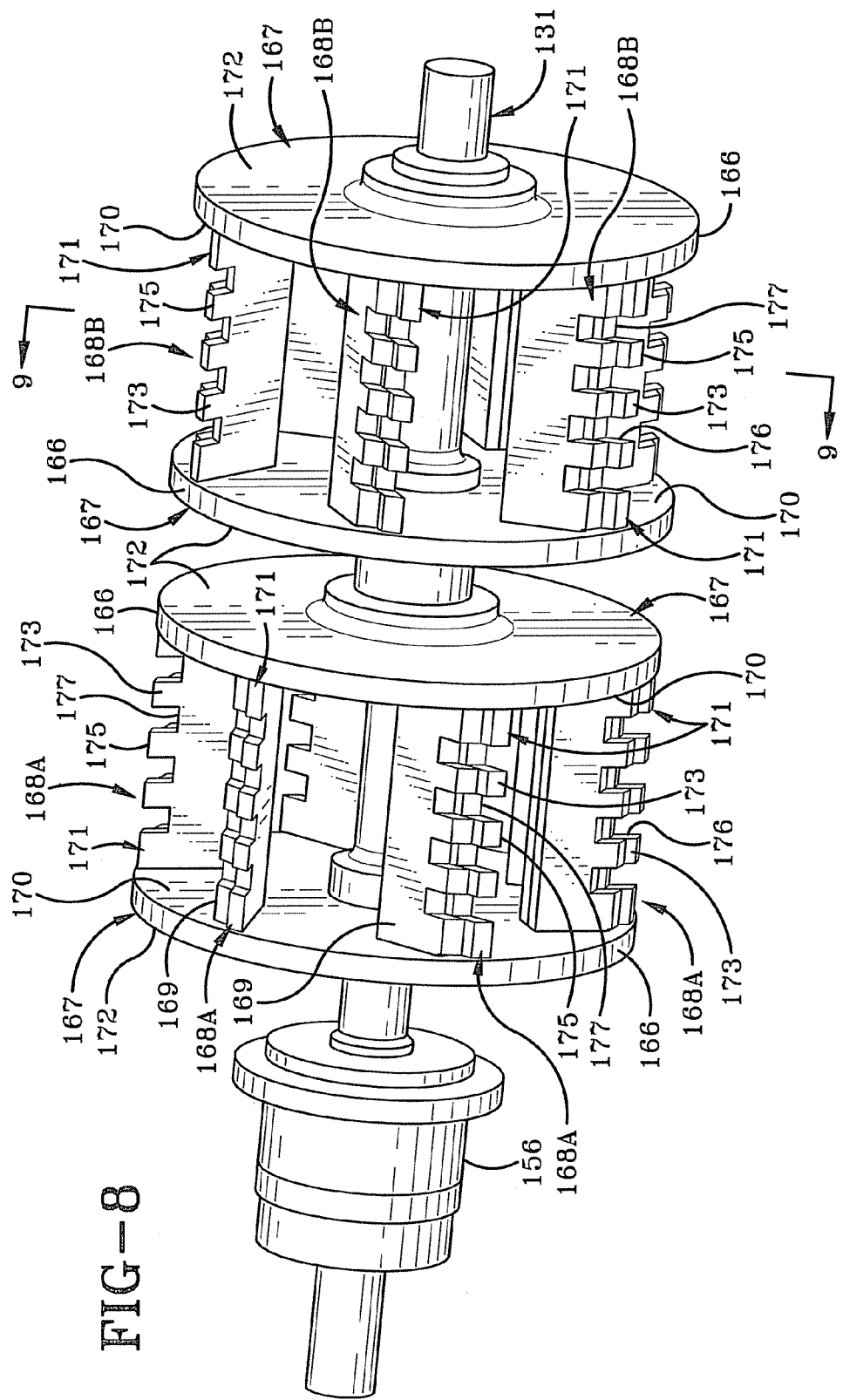
FIG. 8 is a perspective view of the rotors disposed on the rotor shaft.

As shown in FIG. 8, cutter assembly 45 further includes a pair of rotors 165A and 165B. Rotors 165A and 165B are substantially identical, therefore only rotor 165A is described in detail. Rotor 165A is secured to shaft 131 whereby rotation of shaft 131 rotates rotor 165A. Rotor 165A includes of a pair of side disks 167, each having an inner surface 170, an outer surface 172, and an outer circular edge 166. Each pair of side disks 167 are held securely together by a plurality of blade assemblies 168 secured to inner surfaces 170 of side disks 167.

As shown in FIGS. 8-12, each blade assembly 168 is disposed at a spaced distance apart from one another on rotor 165A and extend towards outer edge 166 of side disks 167. Each blade assembly 168 includes a blade holder 169 and a blade plate 171 equal in length to maintain side disks 167 apart at a desired width. Each blade plate 171 includes a top surface 178 and is removably secured to blade holders 169 along top surface 178 to allow a user to remove blade plate 171 through access panels 163 for maintenance or replacement.

Figure 12:
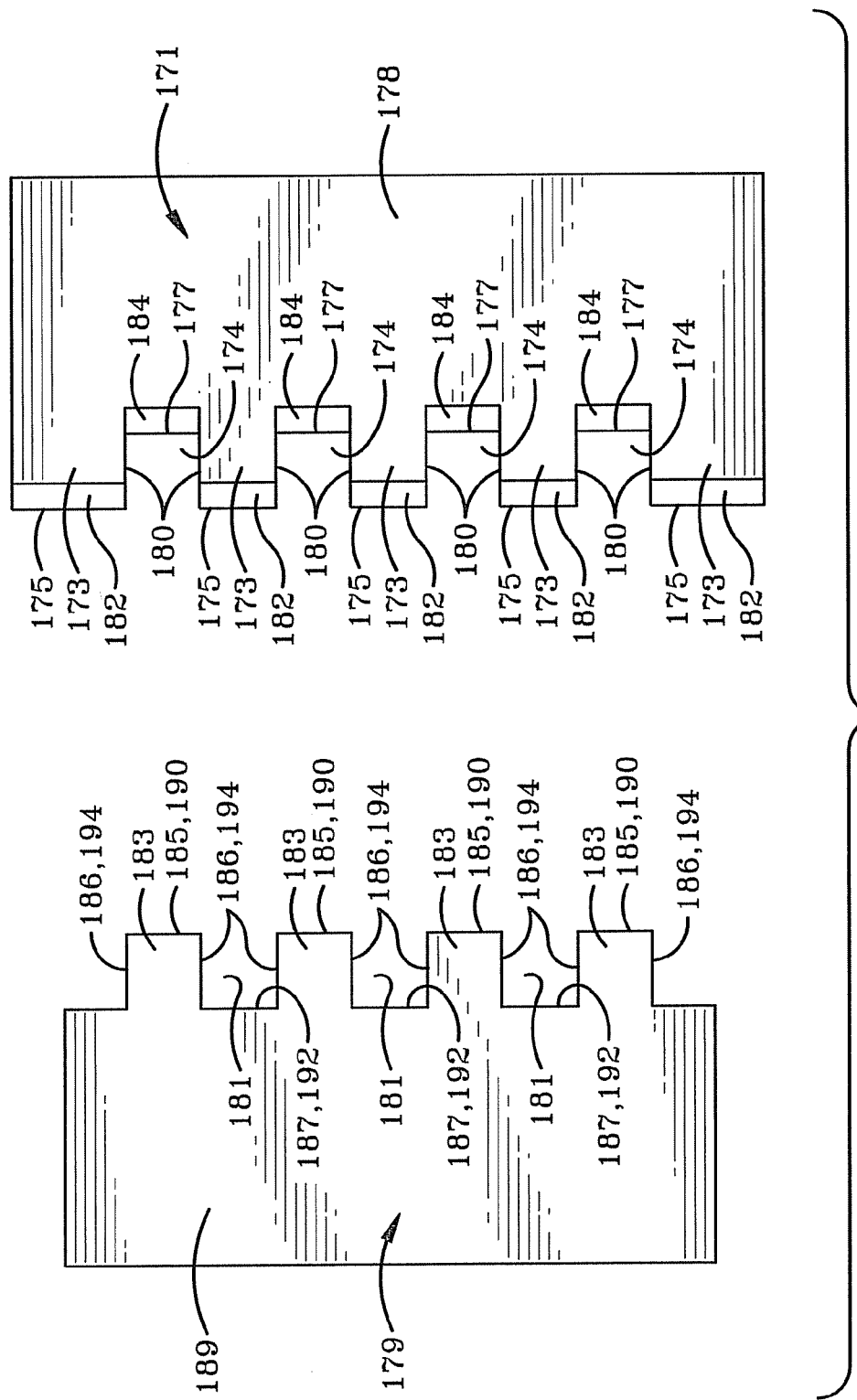
FIG. 12 is a top view of the anvil and blade plate.
Figure 13:
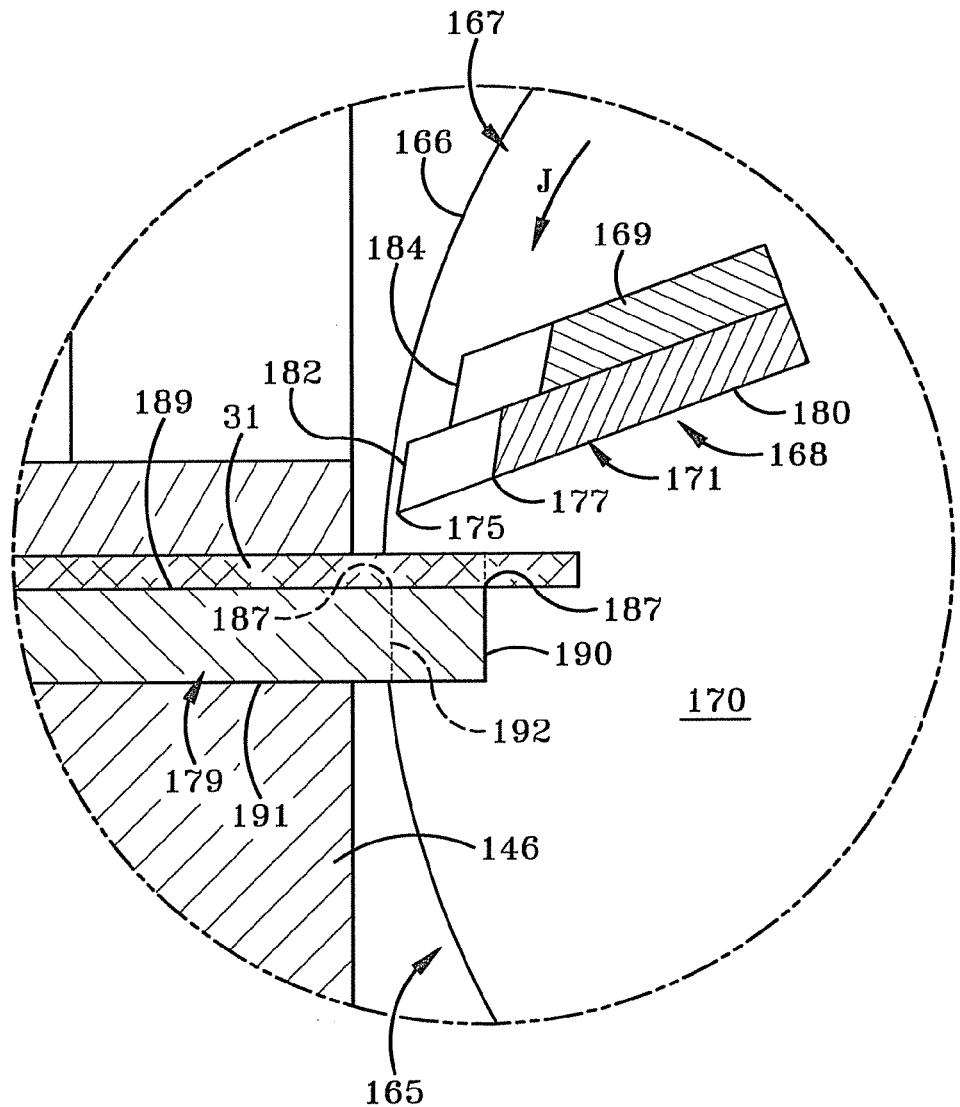
FIG. 13 is an enlarged cross-sectional view of the blade plate approaching the anvil and edge trim.
Figure 15:
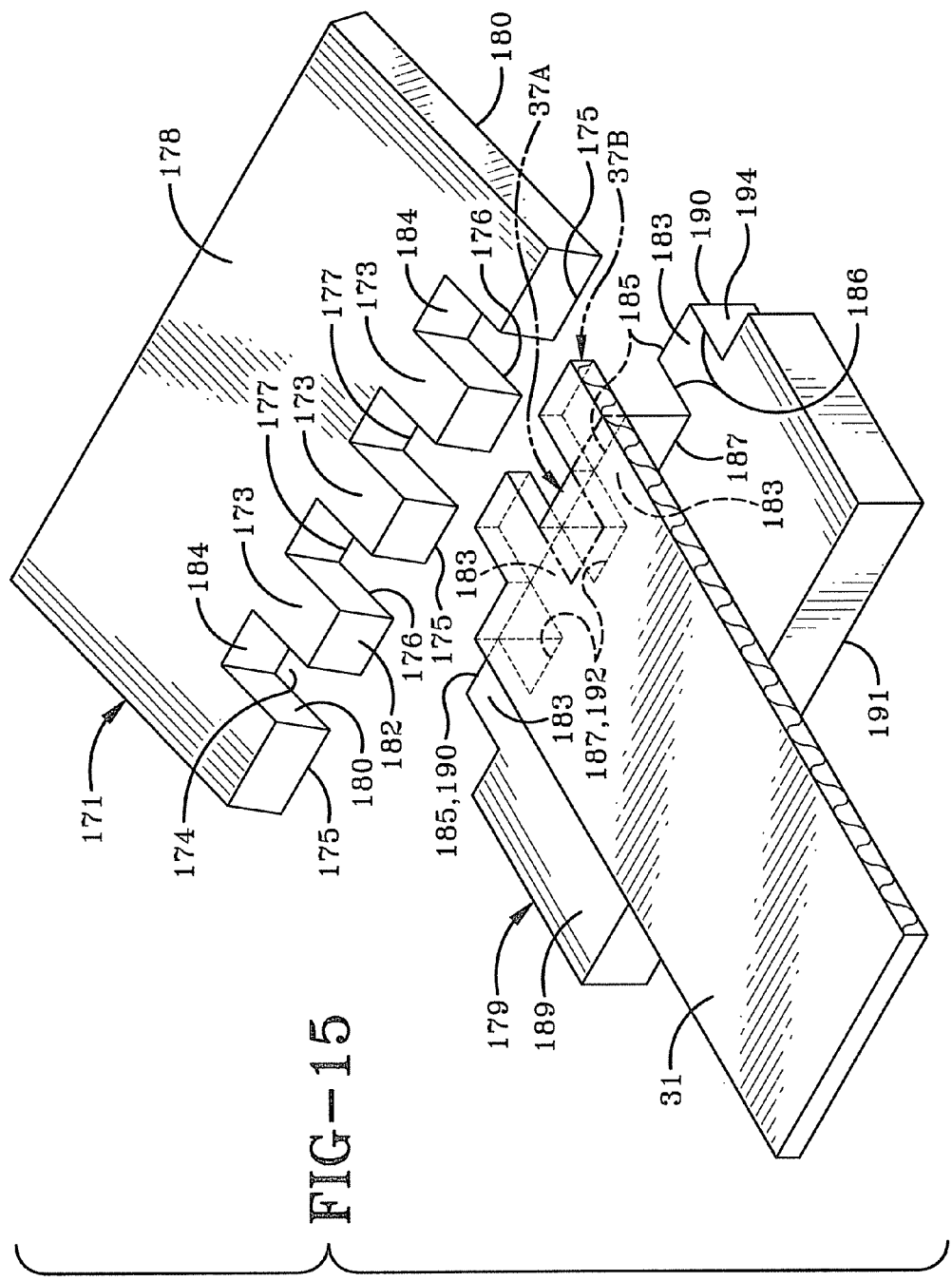
FIG. 15 is an enlarged perspective view of the blade plate approaching the anvil and edge trim as shown in FIG. 13.

As shown in FIGS. 12 and 13, each blade plate 171 further includes a plurality of blades 173. Each blade 173 includes an angled front surface 182 terminating in a cutting edge 175, and two side surfaces 180, each terminating in a cutting edge 176 (FIG. 15). Each blade 173 defines a plurality of recesses 174 therebetween, whereby blades 173 and recesses 174 are arranged in a "sawtooth" pattern. An angled surface 184 extends between each blade 173 proximate each recess 174, whereby angled surface 184 terminates in a cutting edge 177 (FIG. 15).

As shaft 131 turns, rotors 165A and 165B turn to pass blades 173 through a pair of complementarily shaped anvils 179 as each blade assembly 168 rotates past anvils 179. As shown in FIGS. 12 and 13, each anvil 179 includes a top surface 189 and a bottom surface 191 and is removably secured to stabilizing beam 146 along bottom surface 191 (FIG. 7). Each anvil 179 further includes a plurality of teeth 183. Each tooth 183 includes a front surface 190 terminating in a front edge 185, and two side surfaces 194, each terminating in a side edge 186. Each tooth 183 defines a plurality of recesses 181 therebetween, whereby teeth 183 and recesses 181 are arranged in a "sawtooth" pattern. A back surface 192 extends between each tooth 183 and proximate each recess 181, whereby back surface 192 terminates in a back edge 187.

Figure 9:
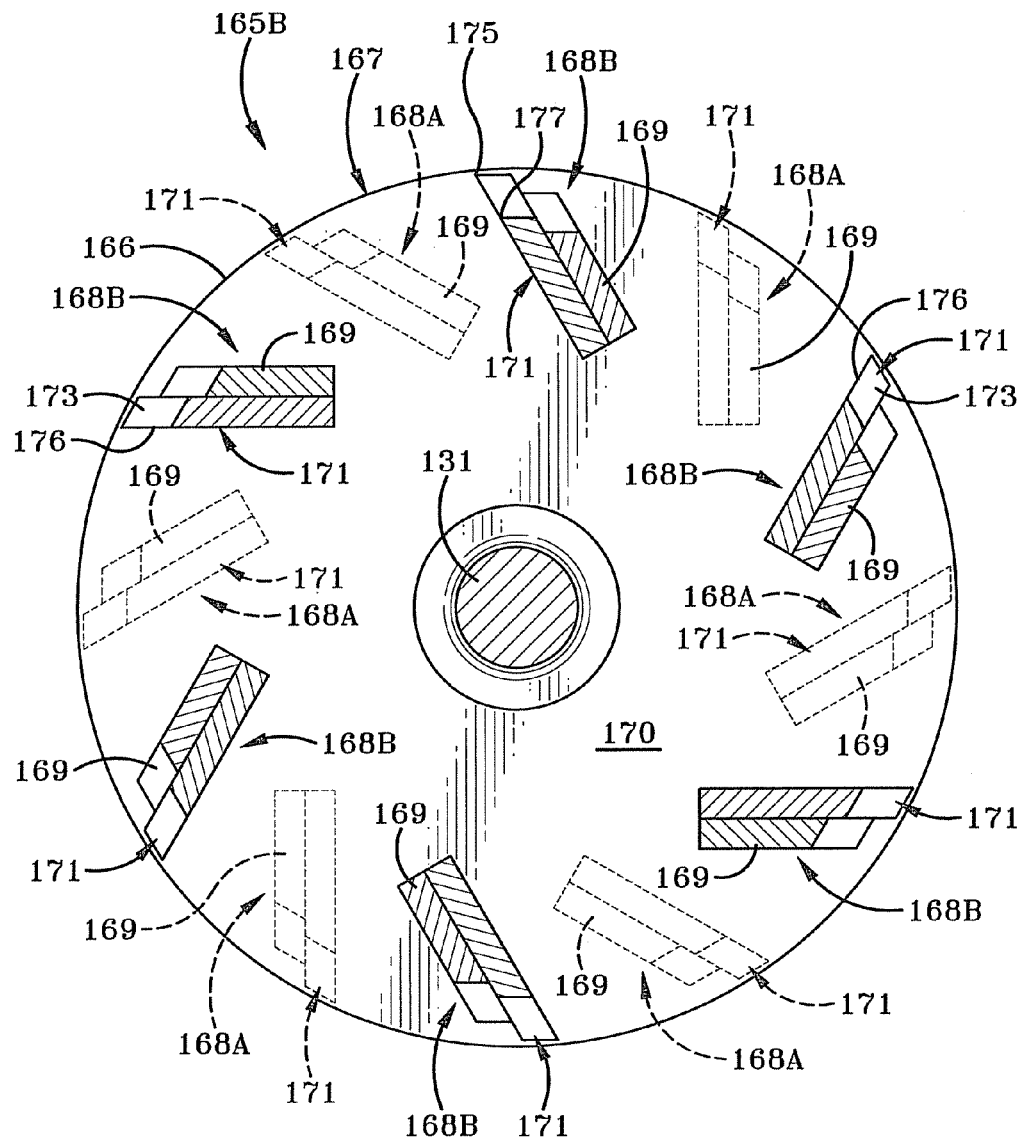
FIG. 9 is a sectional view of one of the rotors taken along line 9-9 of FIG. 8, with the blade assemblies of the other rotor shown in phantom.

As shown in FIG. 9, rotor 165A includes blade assemblies 168A and rotor 165B includes blade assemblies 168B. Blade assemblies 168A and 168B are preferably cross-sectionally intermediate one another and preferably spaced cross-sectionally equidistant apart. As each rotor 165A and 165B turn, blades assemblies 168A and 168B, respectively, are positioned to pass blades 173 through recesses 181 in anvils 179 in an alternating sequence between blade assemblies 168A and 168B. Alternating passes from blade assemblies 168A and 168B reduces the force on anvil mount 146 as only one blade assembly 168A or 168B passes through anvil 179 at a given time, rather than both blade assemblies 168A and 168B simultaneously.

Figure 14:
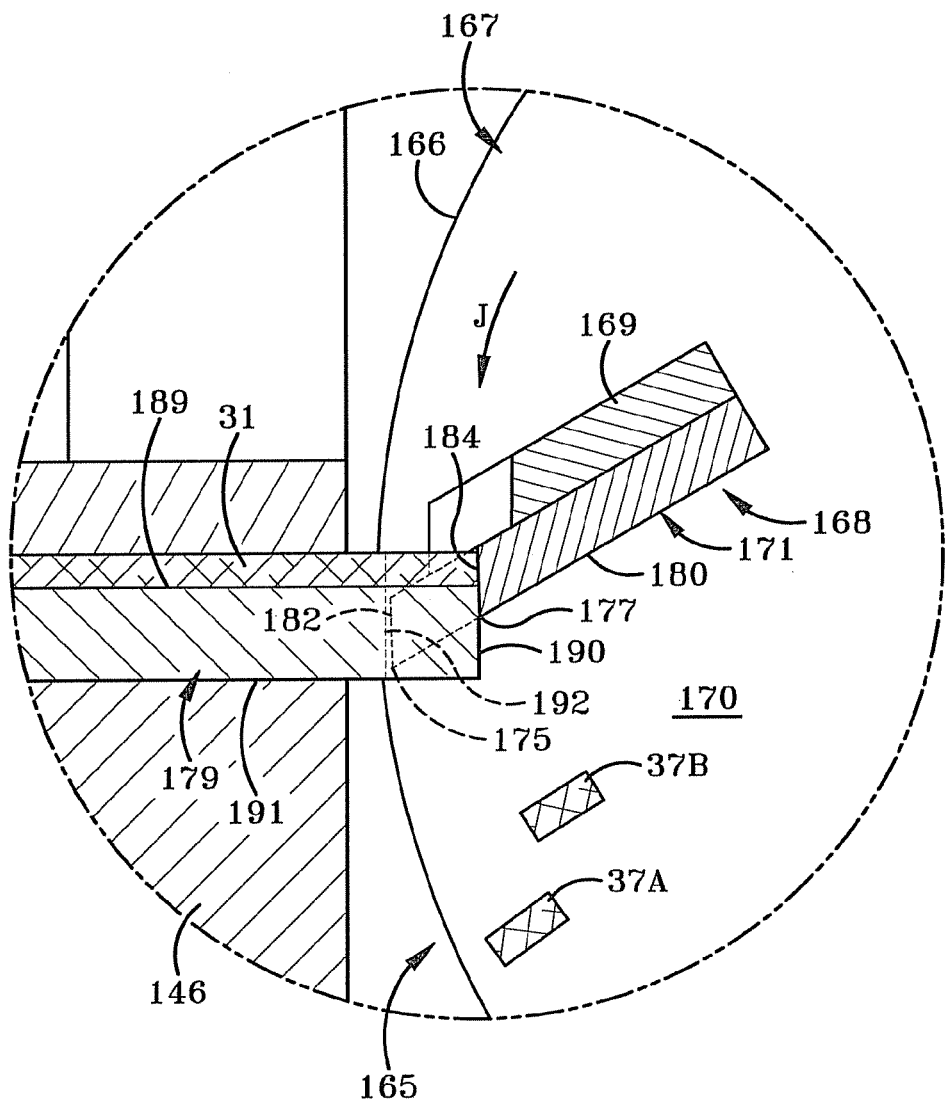
FIG. 14 is an enlarged cross-sectional view similar to FIG. 13 showing the blade plate cutting the edge trim against the anvil.

As shown in FIGS. 12, 15, and 16, anvil 179 and blade plate 171 are complementarily shaped to cut trim edges 31 into small, generally rectangular pieces 37 as blades 173 pass through recesses 181 in anvil 179. Cutting edges 176 are configured to cut in a generally perpendicular direction to cutting edges 175, and cutting edges 177 are configured to cut in a generally parallel direction to cutting edges 175, thus producing the generally rectangular pieces 37. As shown in FIG. 15, trim edge 31 is conveyed over anvil 179, whereby at a particular interval, blades plate 178 plunges through trim edge 31, shearing trim edge 31 against anvil 179 into pieces 37. As shown in FIGS. 13 and 16, cutting edge 175 of blades 173 initiates contact with trim edge 31 as blade plate 171 rotates on rotor 165, whereby trim edge 31 is punctured by cutting edge 175 of blades 173. Next, as rotor 165 continues its rotation, cutting edges 176 of blades 173 shear trim edge 31 along side edges 186 of teeth 183. This shearing is performed from proximate back surface 192 of recess 181 to proximate front surface 190 of teeth 183. As side shearing is completed, the portion of trim edge 31 which was conveyed over recesses 181 in anvil 179 fall away as separate cut pieces 37A (FIG. 14). As shown in FIG. 15, shearing away piece 37A forms the leading edge of the next piece 37A in succession.

As shown in FIGS. 14 and 16, at generally the same moment cutting edge 175 of blades 173 contact back edges 187 of recesses 181, cutting edges 177 on blade plate 171 meet front edges 185 of teeth 183 on anvil 179, shearing trim edge 31 along front edges 185. Thus, the portion of trim edge 31 which was conveyed outwardly beyond teeth 183 of anvil 179 are sheared and fall away as separate cut pieces 37B (FIGS. 15 and 16). As shown in FIGS. 12-16, similar to pieces 37A, shearing away piece 37B forms the leading edge of the next piece 37B in succession. Likewise, when blades 173 shear trim edges 31 into pieces 37A, the side edges of pieces 37B are formed. Pieces 37B consequently require only a single cut between front edges 185 and cutting edges 177 to separate pieces 37A from trim edge 31. This cut is provided by the subsequent blade plate 171 as it rotates on rotor 165A and trim edge 31 is simultaneously conveyed out beyond teeth 183 of anvil 179.

As trim edges 31 enter trim processing machine 1 in the direction of Arrow F (FIG. 11), trim edges 31 are cut along an axis parallel to Arrow F by cutting edges 176 (FIGS. 12 and 15), and an axis perpendicular to Arrow F by cutting edges 175 and 177 (FIGS. 12 and 15). Therefore, trim edges 31 are cut both lengthwise and widthwise and generally perpendicularly in one pass of blade plates 171 to achieve uniform cut pieces 37.

Rotor 165A is rotated at a speed such that when trim edge 31 is conveyed over anvil 179 at the line speed, one of the plurality of blade plates 171 rotates through anvil 179 at precisely the moment to cut trim edge 31 into the desired uniform size pieces 37. As the line speed increases, the rotational speed of rotor 165A increases to continue processing trim edges 31 into the desired uniform size pieces 37. Likewise, as the line speed decreases, the rotational of rotor 165A decreases to continue processing trim edges 31 into the desired uniform size. The uniform size of pieces 37 is considerably smaller in length and width than the original length and width of trim edges 31.

A user may configure the specific size of uniform pieces 37 by replacing anvils 179 and blade plates 171. This is achieved by removing access panels 163 and unsecuring blade plates 171 from blade holders 169. Similarly, anvils 179 may be unsecured from anvil mount 146 and replaced. Thus, blade plates 171 may include differently sized recesses 174 and blades 173, corresponding to anvils 179 having complementarily sized recesses 181 and teeth 183.

As shown in FIG. 11, trim edges 31 are processed into uniform pieces 37 and are expelled in the direction of Arrow K within channel 158. Pieces 37 exit channel 158 through duct 39 and are collected by any means desired by the user. Typically a structure such as hopper 41 is used to collect and store pieces 37. Air conveying technology is commonly used in the art to convey trim pieces 31 into trim processing machines 1. The preferred embodiment of the present invention incorporates air conveying technology into the expelling of pieces 37 into a hopper 41 by directing the flow of air through roller housing 61, continuing through rotor housing 133, and continuing out channel 158 and duct 39.

In operation, raw corrugated sheet 21 is formed in corrugator 3 as discussed above where it is fed into edge cutter 29 at a particular line speed. The line speed changes depending on the particular job requirements and flute size. Sensor 26 is positioned to read the speed with which raw corrugated sheet 21 exits corrugator 3, and continuously relays this information to trim processing machine 1 via conductor 28. As shown in FIG. 2, conductor 28 provides the line speed information to motor 81 which synchronizes the rotational speed of bumpers 97 and 111 in feeder sub-assembly 49A with the current line speed. Conductor 28 further provides the line speed information to motor 123 which synchronizes the rotational speed of shaft 131 in cutter assembly 45 with the current line speed. Trim processing machine 1 must process trim edges 31 at the current line speed to prevent jamming or ripping of trim edges 31.

As shown in FIG. 11, trim edges 31 enter roller housing 61 in the direction of Arrow F. Within roller housing 61, bumpers 97 and 111 rotate to convey trim edges 31 at the line speed into cutter assembly 45. As trim edges 31 enter cutter assembly 45, the leading portion of trim edges 31 are conveyed over anvils 179, and particularly over recesses 181 and teeth 183 of anvils 179. At the moment when precisely the sufficient length of trim edge 31 is conveyed over recesses 181 and teeth 183, a blade assembly 168 on rotor 165A rotates past anvil 179. As blade assembly 168 is passing anvil 179, blades 173 on blade plate 171 pass through recesses 181 of anvil 179. Likewise, at the same moment, teeth 183 of anvil 179 pass through recesses 174 of blade plate 171. The passing of blade plate 171 through complementarily shaped anvil 179 with trim edge 31 positioned therebetween, results in a shearing of trim edge 31 into pieces 37A and 37B.

As pieces 37A and 37B fall away, bumpers 97 and 111 continue to convey trim edges 31 into cutter assembly 45 at the line speed. The required length of trim edge 31 is continuously conveyed over anvil 179 in time for the subsequent blade assembly 168 rotate past anvil 179. If the line speed increases, sensor 26 relays this change to motors 81 and 123, which react accordingly to maintain cutting synchronization with the line speed. Thus, the process of shearing trim edge 31 into pieces 37A and 37B is continuous and precise to generate uniform pieces 37 of trim through dynamic changes in the line speed. Cut pieces 37 fall downward away from anvil 179 and travel out of cutter assembly 45 through channel 158 in the direction of Arrow K into duct 39. Duct 39 directs pieces 37 into hopper 41 where they are collected and bundled for future use.

It is commercially desirable to guarantee a particular size and shape of corrugated pieces expelled from trim processing machine 1. As trim edges 31 are processed into a guaranteed uniform size and shape in trim processing machine 1, independent of the line speed, pieces 37 may readily be bundled and sold as a new product. This represents an improvement in the art, as a new commercial product is created from what was considered previously by the industry to be a waste by-product of the corrugation process. The uniform size may be altered by replacing anvil 179 and blade plate 171, which allows the user to custom tailor the piece sizes for a particular industry or buyer. For example, uniform pieces of corrugated material having a specific size are especially desirable in the equine industry because these uniform pieces 37 cannot become embedded into the animal's hoofs. Furthermore, the low weight pieces 37 are easily shoveled out of the animal stall after use. However, it will be readily understood that the novelty of the present invention extends generally to all strip material, and is not limited to corrugated material.

It will be readily understood that conductor 28 could consist of a wireless communication system, whereby the line speed information is provided to motor 81 and motor 123 wirelessly, or by any other common communication system. Likewise, it will be readily understood that trim edges 31 may be fed directly into a cutter assembly during the corrugation process. However, the preferred embodiment includes a feeder assembly.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method for producing corrugated material comprising:
   forming a corrugated sheet at a variable line speed;
   removing a strip material from an edge of the corrugated sheet at the line speed;
   feeding the strip material into a cutter assembly at the line speed;
   providing a sensor operatively connected to the cutter assembly for measuring the line speed;
   cutting the strip material, in the cutter assembly, in a single pass of a blade plate at a cutting speed into a plurality of pieces having a uniform size;
   synchronizing the cutting speed with the line speed, whereby variations in the line speed results in variations in the cutting speed; and
   maintaining the uniform size through variations in the line speed.

2. The method of claim 1, further comprising the steps of:
   cutting the strip material in a first direction; and
   cutting the strip material in a second direction, whereby the second direction is different from the first direction.

3. The method of claim 2, whereby the first direction and the second direction are generally perpendicular to each other.

4. The method of claim 1, further comprising the steps of:
   providing the blade plate having a plurality of blades in the cutter assembly;
   providing an anvil having a plurality of teeth in the cutter assembly; and
   engaging the blades with the teeth, whereby the blades and teeth cooperate to cut the strip material.

5. The method of claim 4, further comprising the step of arranging the blades and teeth in a complementary sawtooth pattern.

6. A method for producing corrugated material comprising:
   forming a corrugated sheet at a line speed;
   removing a strip material from an edge of the corrugated sheet at the line speed;
   feeding the strip material into a cutter assembly at the line speed;
   providing a blade plate having a plurality of blades in the cutter assembly;
   providing an anvil having a plurality of teeth in the cutter assembly;
   engaging the blades with the teeth, whereby the blades and teeth cooperate to cut the strip material
   providing a rotor in the cutter assembly;
   securing a plurality of blade holders to the rotor;
   removably securing blade plates to each blade holder to form a plurality of blade assemblies;
   rotating the rotor to successively engage the blades of each blade plate with the teeth, whereby the blades and teeth cooperate to cut the strip material;
   providing a sensor operatively connected to the cutter assembly for measuring the line speed;
   cutting the strip material at a cutting speed into a plurality of pieces having a uniform size;
   synchronizing the cutting speed with the line speed, whereby variations in the line speed results in variations in the cutting speed; and
   maintaining the uniform size through variations in the line speed.

7. The method of claim 6, further comprising the steps of:
   providing a motor to rotate the rotor;
   operatively connecting the sensor to the motor; and rotating the rotor to cut the strip material at the cutting speed.

8. The method of claim 7, further comprising the steps of:
   providing a feeder assembly to convey the strip material into the cutter assembly;
   operatively connecting the feeder assembly to the sensor; and conveying the strip material from the feeder assembly to the cutter assembly at the line speed.

9. The method of claim 8, further comprising the steps of:
   providing a housing in the feeder assembly;
   providing a plurality of first bumpers in the housing;
   providing a plurality of second bumpers in the housing; and
   rotating the first and second bumpers to convey the strip material therethrough and into the cutter assembly at the line speed.

10. A method for producing corrugated material comprising:
    forming a corrugated sheet at a line speed;
    removing a strip material from an edge of the corrugated sheet at the line speed;
    feeding the strip material into a cutter assembly at the line speed;
    providing a blade plate having a plurality of blades in the cutter assembly;
    providing a stationary anvil having a plurality of teeth in the cutter assembly;
    engaging the blades with the teeth, whereby the blades and teeth cooperate to cut the strip material;
    providing a sensor operatively connected to the cutter assembly for measuring the line speed;
    cutting the strip material in a single pass of the blade plate at a cutting speed into a plurality of pieces having a uniform size;
    synchronizing the cutting speed with the line speed, whereby variations in the line speed results in variations in the cutting speed; and
    maintaining the uniform size through variations in the line speed.

* * * * *